Patented Feb. 21, 1939

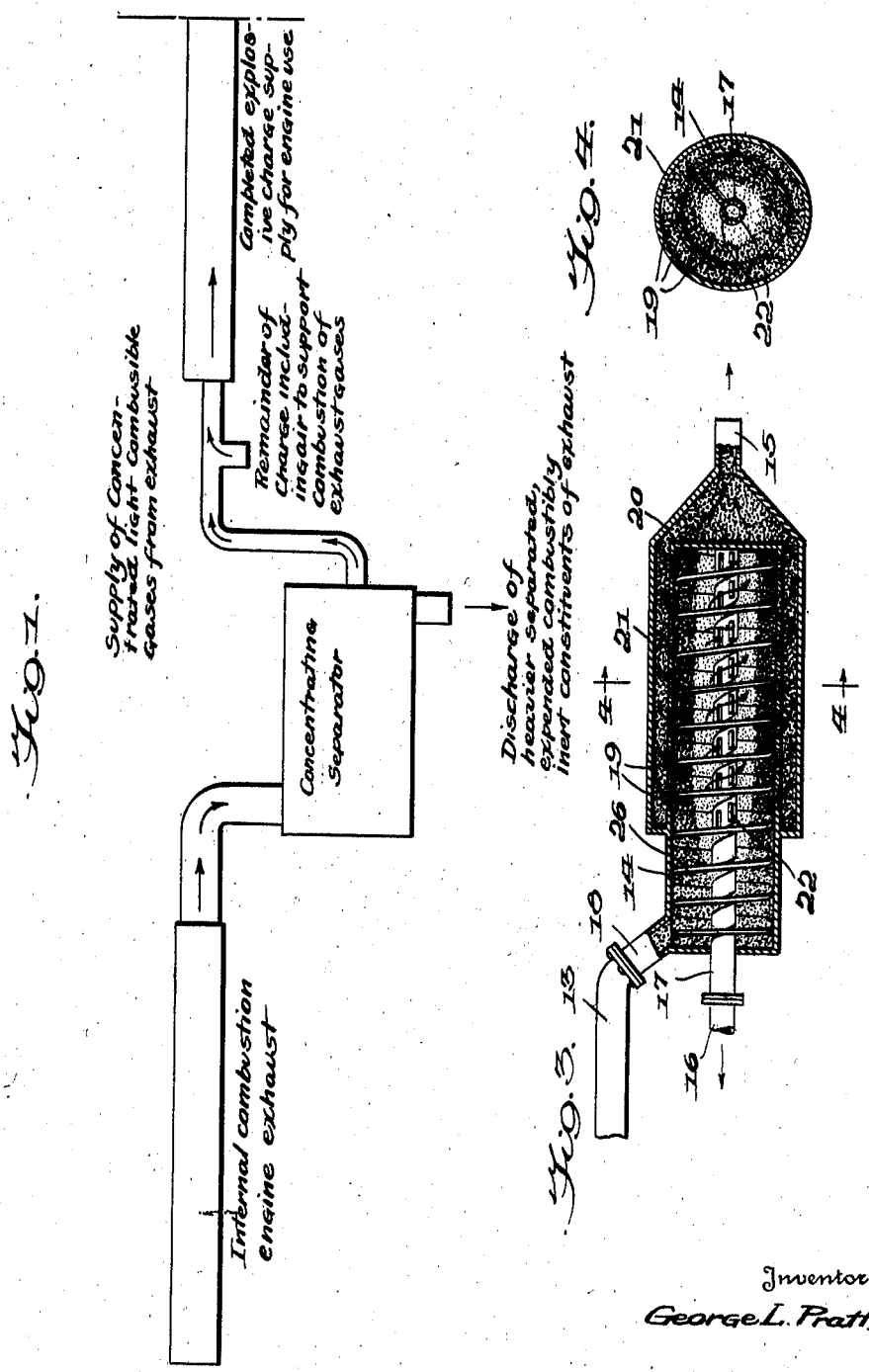

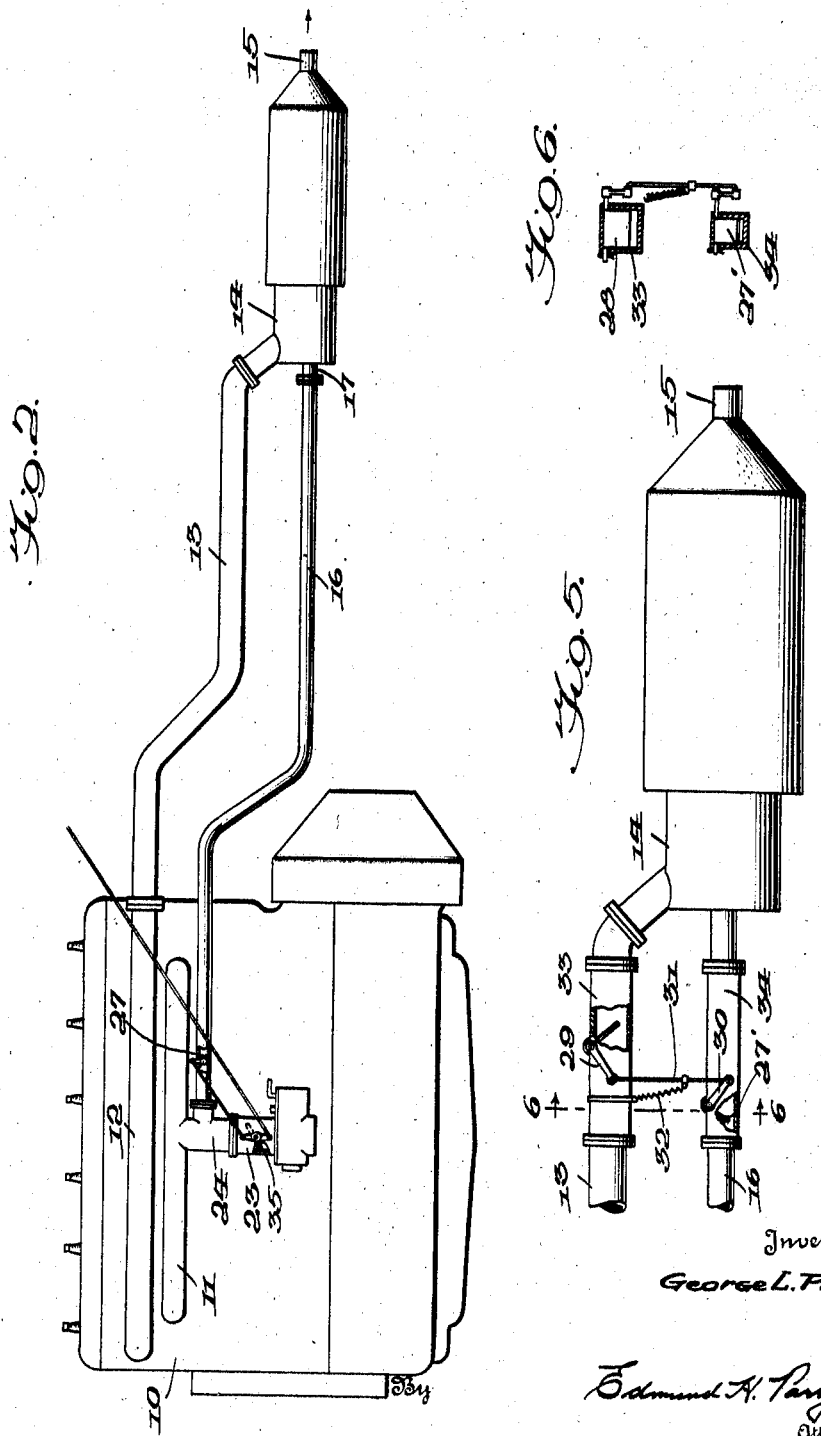

2,147,670

UNITED STATES PATENT OFFICE 2,147,670

METHOD AND APPARATUS FOR TREATING AND UTILIZING EXHAUST GASES OF INTERNAL COMBUSTION ENGINES

George L. Pratt, Atlanta, Ga., assignor to Motor Power, Inc., Atlanta, Ga., a corporation of Georgia Application April 26, 1934, Serial No. 722,600

26 Claims. (Cl. 123—119)

This invention relates to the utilization of the exhaust gases from internal combustion engines, and concerns particularly the re-use of a portion thereof containing unconsumed combustibles in a combustible charge in such type of engine. The invention is directed to a method of treating the exhaust and the formation thereof into a charge with a view of promoting and improving the benefits derived from the gases on recombustion and novel system and apparatus for obtaining the desired results.

The exhaust from internal combustion engines in the form produced consists of a mixture of various incombustible matter and unconsumed components derived from the engine charge and which is different in composition and characteristics from the ordinary engine fuel charge. The combustibly inert matter, including carbon dioxide, nitrogen and water vapor, makes up the larger proportion of the exhaust, and the valuable combustibles, in the form of hydrogen, carbon monoxide and methane, exist only in smaller quantities. In the condition in which it is obtained the mixed exhaust resulting from explosion of the usual engine fuel charge is not in satisfactory condition for recombustion, at least in any substantial amount, since not only is the concentration of combustible components therein so weak as to be non-conducive to the intense combustion essential to proper engine operation and power development, but the presence during re-use of the exhaust of undue quantities of the combustibly inert matter, including nitrogen and especially carbon dioxide, seriously impairs combustion by retarding and under some conditions even completely blanketing the propagation of flame through the already dilute combustible components of the exhaust gases. While numerous proposals have been heretofore made to re-use the gases, the volume which could be successfully employed in combustion engines without interfering with or rendering erratic instead of aiding combustion has therefore been so restricted that little of the combustible values potentially present could be utilized. The main function served by the gases, and apparently the only one seriously intended, resulted from the vaporizing influence of the heated gases on the fresh fuel charge admixed therewith.

According to the present invention, the above and other difficulties incident to the re-utilization of internal combustion engine exhaust gases for combustion purposes are at least in a large measure overcome by treating the gases to remove deleterious and useless portions thereof with a view of promoting combustibility and at the same time thereby increasing the combustible constituent concentration of the exhaust which is to be supplied for engine use. The proposed treatment involves the selective separation of the exhaust mixture on the basis of the combustibility and incombustibility of its various components so that the heavier expended, or otherwise combustibly inert water vapor, carbon dioxide and nitrogen are to a substantial degree removed and discharged, leaving a refined lighter portion containing hydrogen, methane and carbon monoxide in increased proportions, which may be efficiently employed in either the exhaust producing engine or other engines with great advantage over an untreated exhaust gas mixture. The removal of excessive quantities of combustion-blanketing parts of the exhaust not only increases the concentration of the combustibles per unit quantity of gases, but enables a larger quantity to be supplied to an engine than was possible under prior practices.

The general process contemplated to obtain the desired results consists in conducting the exhaust gases, preferably as rapidly as formed, from the producing source to a continuously operating separating device, concentrating the same therein to provide a body of gases of increased combustibility, discharging the waste products from the separator, supplying the treated gases to the combustion engine in which they are to be used preferably as rapidly as formed in a continuous flow according to the engine demand, making said gases into a charge including air to support combustion of their unconsumed ingredients, and finally subjecting the charge to combustion in the engine.

As the most effective manner of carrying out the process now known to me, I propose to resort to mechanical action in producing the desired segregation of gases rather than to depend upon chemical agencies. This is for the reason that with chemical reaction or absorption it is difficult in practical operation to separate rapidly and efficiently the gases to obtain a satisfactory utilizable portion of increased combustible concentration from which excessive proportions of combustibly inert constituents such as exist in the original exhaust with their combustion-blanketing influence have been withdrawn. Unless carried out with extreme care and fairly complicated apparatus, chemical separation is likely to remove or destroy the desirable combustible exhaust components of hydrogen, methane and carbon monoxide which are quite active chemically incident to the removal of the useless exhaust portions.

It is therefore one of the main objects of the invention to produce a separation of the exhaust into reutilizable and waste portions mechanically, and to this end to stratify the mixed gases according to their densities into a portion containing the heavier gases in greater proportion which may be withdrawn and a second portion in which the lighter gases are obtained to a large degree in a more concentrated state. Such type of treatment can be successfully applied to exhaust gases for my particular purpose by reason of the fact that the combustible components of the original mixed exhaust which are to be concentrated and re-used constitute the lighter exhaust components, the incombustibles, of which excessive portions must be removed, particularly carbon dioxide, with its serious combustion-blanketing influence, being heavier.

In carrying out the objects of the invention the exhaust gases are centrifuged and certain portions thereof are eliminated to provide a combustibly improved body of gases which can be, and is, supplied to an internal combustion engine for use therein.

A centrifugal separator is relatively simple and admirably suited to the rapid separation which is in most instances essential from the practical standpoint. The exhaust gases as rapidly as discharged from their engine source and under the propelling force created incident to their discharge, pass continuously and rapidly through such device according to my proposed process and system, the undesired part of the exhaust being discharged and the treated remainder of increased combustible concentration leaving the device in a continuous flow to be fed as a charge component to the particular combustion engine which is to utilize the same.

While the ability to efficiently separate mixed gases centrifugally might be doubted, surprising results beyond reasonable expectation have been obtained by this method in actual practice with automobile engines wherein the treated gases have been cycled back as a component of the air and fresh fuel mixture, and such engines manifest pronounced increases in power and general operating efficiency. I do not contend that it is possible with separating devices now known to me that the separation of the exhaust gases may be carried out in such manner as to remove only combustibly inert ingredients, carbon dioxide, nitrogen and water vapor, and retain for re-use in an engine all of the combustible components, hydrogen, methane and carbon monoxide. I have demonstrated, however, that even with only partial and very incomplete separation using a crude separator the treated portion of gases to be re-used manifests a material increase in the components of the original gases susceptible to re-combustion accompanied by a decrease in the combustibly inert components, while correspondingly the portion of the exhaust discharged as waste manifests a substantial decrease in the combustible components and increase in the proportions of the combustibly inert matter.

By way of illustration of the results obtained and in explanation of the statement last made, the following figures are given. The same represent the percentages by volume of the various components in the treated return portion and the waste portion compared with the proportions of the components existing in the original exhaust before treatment. The figures are the mean average figures obtained in a series of actual tests with an eight cylinder automobile engine for which the fresh fuel-air ratio of the charge with which the returned exhaust was admixed was 1 to 13.

*Analysis of constituency according to volume of treated exhaust for re-use and of portion eliminated by centrifugal separation compared with original mixed exhaust before treatment.*

| Constituents of exhaust | Exhaust before treatment | Treated exhaust for re use | Portion eliminated by separation |
|---|---|---|---|
|  | Percent | Percent | Percent |
| Nitrogen | 81.4 | 79.9 | 82.9 |
| Oxygen | 0.2 | 0.0 | 0.0 |
| Carbon dioxide | 8.4 | 7.3 | 9.8 |
| Hydrogen | 2.3 | 4.1 | 0.7 |
| Carbon monoxide | 7.1 | 8.4 | 6.3 |
| Methane | 0.6 | 0.3 | 0.3 |
| Total combustibles | 100.0 | 100.0 | 100.0 |
|  | 10.0 | 12.8 | 7.3 |

NOTE.—The water vapor exhaust constituent was necessarily eliminated as a preliminary to making the analyses on a dry basis and its proportions were not determined. The treated exhaust and the waste portion eliminated by discharge were separated on the basis of approximately equal volumes.

It will be noted in the tests referred to that in the return the particularly combustible hydrogen and also the carbon monoxide underwent pronounced increases in concentration, while there was a considerable reduction in the combustion-blanketing carbon dioxide and some decrease of the substantially neutral nitrogen.

The results obtained in the actual test are better than might be expected theoretically on the basis of the comparative specific gravities of the various exhaust components, and may be due to certain peculiarities in the composition of the exhaust gas, favorable physical affinities between certain of the components, and/or the temperature and other conditions which exist during the separation treatment.

The total proportion of the combustibles in the exhaust after treatment might appear small, and their increase in concentration from 10% to 12.8% of no great significance. This is not the case, however, as it must be borne in mind that the proportions of the ingredients making up an explosive charge for combustion engines are quite critical, and slight changes in proportions in either direction may take the charge out of or bring it within the required limited range under which the charge will explode with detonating force and produce appreciable power. The fact is, as can be conclusively demonstrated, that the quantity of combustibles available after treatment, even though substantially diluted by non-combustible gas, is of tremendous value for re-use in engines. The treated charge as compared with untreated exhaust gases behaves differently, is more adaptable to ignition and explosion and can be employed in larger quantities for the production of power. Further the gain in concentration from 10% to 12.8% as was obtained in the above referred to tests is of paramount value, representing as it does a 25% increase in combustibles over the exhaust before treatment. Without treatment the exhaust gases are just on the border line of inflammability due to their degree of dilution by the other exhaust components and the combustion retarding influence exerted by the carbon dioxide. By increasing the concentration of the combustibles so that their proportion with respect to the other components is appreciably raised and at the same time the carbon dioxide diminished, a body of gas is obtained well above the critical limit of inflammability wherein the combustible components are now in condition to be readily ignited and undergo an intense combustion. The original exhaust gases without treatment because of excessive dilution and the adverse influence of the carbon dioxide are not readily ignitable, and at best burn with a slow weak flame which is of no practical value in combustion engine cylinders. By the treatment herein proposed, a selected portion of the exhaust is obtained well within the limits of inflammability which will readily ignite and undergo an intense quick combustion of explosion magnitude.

What has just been stated with reference to the characteristics of exhaust gases with and without the separation treatment constitutes the key to the present invention and to the tremendous beneficial results secured thereby.

Aside from the value of the returned exhaust as a combustible power producing agent in the engine, the increased concentration of combustibles existing in the return also appears to have a marked beneficial effect in promoting the intensity of combustion of fresh fuel, inasmuch as it has been found possible to utilize a much leaner air-fresh fuel mixture with resulting fuel economies. This is demonstrated by the fact that with the engine used in the tests above alluded to, when operating under normal road conditions at both low and high speeds, an increase in mileage per gallon of fresh fuel in no case was less than 100%. Such engine, without the invention, consistently obtained only approximately 12 miles per gallon of gasoline and with the invention applied obtained mileages ranging from 25 to 45 miles per gallon at varying speeds, and under various adjustments of the fresh fuel-air ratio and the quantity of treated exhaust used.

It will be clear from what has been stated that perfect separation of the exhaust components is not essential to the successful operation of the invention, and that the advantageous results obtainable are far beyond theoretical expectation.

The general description of the essential features and characteristics of the process has been given by way of introduction as a basis for better understanding one practical application of the invention with reference to the illustrative drawings now to be discussed. In such drawings:

Fig. 1 is a schematic view visualizing the various steps in my process;

Fig. 2 is a diagrammatic view of a conventional internal combustion engine illustrating in connection therewith one practical embodiment of my invention for re-using exhaust gases;

Fig. 3 is a view in sectional elevation illustrating a centrifugal form of concentrating separator which may be employed in the system of Fig. 2;

Fig. 4 is a transverse section of the separator taken on line 4—4 of Fig. 3;

Fig. 5 is a fragmentary enlarged view of a part of the system shown in Fig. 2, showing particularly a modified valve arrangement for controlling the return flow of treated exhaust gases; and Fig. 6 is a sectional view taken on the line 6—6 of Fig. 5.

The schematic representation in Figure 1, visualizing the steps of my process for creating and reutilizing the exhaust gases and the general features of the system to carry out such process will be understood from the description heretofore given. The exhaust gases from an internal combustion engine, instead of being discharged to the atmosphere in the usual manner, are conducted through a concentrating separator wherein a concentration of the combustible constituents of the mixed exhaust is obtained in one portion of the gases which is to be re-used, while the remaining gases are allowed to discharge into the atmosphere as waste. The treated gases are conducted out of the separator and supplied to an internal combustion engine for combustion purposes in accordance with the demand of the engine under varying speed and load. Air to support combustion of the combustibles in the treated exhaust must, of course, be admixed with the gases, and at least in the preferred arrangement of the invention the engine charge will include fresh fuel in appropriate proportions. In most instances the exhaust gases after treatment will be returned to the same engine in which they are produced but, of course, the process also contemplates that the treated gases may be used in an entirely different engine or engine cylinders. It will be evident from Figure 1 that the process can be carried out as a continuous operation so that a constant supply of treated gases may be available to the engine which is to utilize the same.

To better illustrate the practical application of my invention I have illustrated in Figure 2 a system for re-using the exhaust gases which includes mechanism (better shown in Figure 3) for treating the gases to put the same in better condition for re-use. Such system includes an internal combustion engine 10, which in itself is of conventional design and may comprise any number of cylinders. The usual intake manifold 11 and exhaust manifold 12 are provided. Connecting with the manifold 12 is a conduit 13 which normally would lead to some conventional type of muffler from which the exhaust gases conducted therethrough would be discharged to the atmosphere. According to my invention, however, the conduit 13 will connect with a gas separating device 14. From such device a portion of the gases will be discharged at 15 to the atmosphere while a second portion will be cycled back to the engine through a return conduit 16 for re-use therein. The return pipe 16 here connects with the intake manifold 11, and the return gases will admix with the usual fresh fuel and air which may be supplied in the form of a charge of regulatable proportions by the carburetor or other charge forming device 23.

The gas treating device 14 shown in detail in Figs. 3 and 4 comprises a centrifuge adapted to centrifuge the exhaust gases and divide the same into a portion for re-use and a waste second portion which is discharged. Under the centrifugal action the various mixed components of the exhaust gases tend to redistribute themselves into annular strata according to their specific gravities so that a portion of the centrifuged gases for re-use may be obtained wherein the combustible gases, which are lighter, exist in greater concentration. Such device somewhat resembles in outward appearance a conventional type of muffler, the same comprising a cylindrical chamber denoted by the main reference character 14, through which extends a helically formed partition 26. The successive convolutions of the partition divide the chamber into a spiral passageway around which the gases rush under the relatively high velocity inherent therein. Extending longitudinally of the chamber through a central opening defined by the inner edge of the spiral partition is a pipe 17, the function of which will shortly become apparent.

The separator will have an inclined intake 18 connecting with the exhaust gas conduit 13. In their spiral course a centrifugal force is created in the mixed exhaust gases which tends to throw the heavier constituents out towards the periphery of the chamber and leaves the gases of lighter specific gravity in the central zone immediately around the pipe 17. The separation between the various lighter and heavier components becomes more complete as the gases progress through the chamber. Figs. 3 and 4 have been stippled to show a light central area representing the lighter gases and a darkly shaded area representing the heavier gases thrown outwardly by centrifugal force.

The zone of gases in the central portion of the separator is the zone from which is withdrawn what has above been termed the treated exhaust which is to be re-employed for combustion purposes, the same because of the action of the device containing an increased proportion of the light combustible constituents, hydrogen, carbon monoxide and possibly methane. The outer zone of gases will include an increased concentration of the combustibly inert constituents of the original exhaust, carbon dioxide, nitrogen, water vapor, and possibly traces of oxygen and any solid foreign matter such as carbon. Arrangement is made in the device for the withdrawal of each of these bodies of gases. The wall of the chamber 14 is provided with a series of apertures 19 through which the heavy gases of the outer zone may pass, the end of the chamber 14 being provided with a solid wall 20. Surrounding the chamber 14 is an outer casing 21 in which the heavier gases discharged through the apertures 19 are collected, such outer chamber terminating in a tapering end having therein the discharge 15 (previously referred to in connection with Figure 2) through which the heavier gases are discharged as waste into the atmosphere. The higher the velocity of flow of the gases through the separator, the greater will be the centrifugal force and separating action. For this reason it seems desirable that the discharge outlet 15 take the form of a free open port which will minimize back pressure and avoid retardation in the free flow of gases through the device.

It will be noted that in the system shown in Figure 2 no conventional muffler for deadening the noise of the exhaust gases is provided. While a muffler may be used it is not necessary for the reason that a centrifuge of the type shown in Figure 3 serves as a satisfactory muffler as well as effecting the desired concentration of the lighter exhaust gases.

The pipe 17 extending centrally through the chamber is provided with a series of inlet ports 22 through which gases from the lighter central zone enter the pipe for withdrawal from the separator. As will be noted from a comparison of Figures 2 and 3, the pipe 17 constitutes the gas inlet supply end portion of the exhaust return pipe 16.

It will be obvious that the inlet apertures in the return pipe portion 17 and the discharge apertures 19 in the wall of the separating chamber should not extend to the inlet end of the separator since it is obvious that the mixed gases do not begin to separate under centrifugal action until they have passed a portion of the distance through the separator. In Figure 3 said several series of apertures extend for approximately the last two-thirds of the length of the device, but such representation is more or less arbitrary.

The separator, whether it follow the embodiment just described or take some other form, should be constructed so as to have the greatest possible efficiency. While as previously indicated the successful operation of my system as illustrated by the tests described does not require a complete separation of the mixed exhaust gases into its lighter and heavier constituents, the results to be obtained by the invention will to a degree be measured by the efficiency of the separator employed. With reference to the particular separator illustrated, it should be pointed out that the various parts should be constructed and joined in such a way as to provide a smooth walled spiral passage for the gases with a view of avoiding any unnecessary eddy currents or other agitation of the gases which might interfere with the separating treatment.

The separating device described as applicable for use in carrying out my process and shown in the system of Figure 2 embodies numerous novel features, and the same is described in more detail and claimed in my co-pending application Serial No. 153,822, filed July 15, 1937, which is a continuation in part of my earlier application Serial No. 722,601, filed April 26, 1934.

From the description of the separating device 14 in connection with the discussion of the character of the original exhaust gases delivered from the engine through the pipe 13, it will be understood that the gases withdrawn through the return pipe 16 are enriched in the combustible components of the exhaust by withdrawal of heavier portions of the exhaust including water vapor, carbon dioxide and at least a small proportion of nitrogen. Despite the fact that the combustible components of the treated gases may still be rather dilute by reason of the return of combustibly inert matter, principally nitrogen, such gases have now been brought within the limits of inflammability so as to be far more combustible than the mixed exhaust gases without treatment. In the presence of the proper proportion of air they explode rapidly and intensely, and will add materially to the explosion of the fresh fuel supplied to the engine by the charge forming device 23.

The enriched exhaust gases returned to the engine through the pipe 16 can conveniently be admixed with the fresh fuel air charge from the carburetor in the inlet 24 of the engine intake manifold 11. The explosive charge supplied to the engine will therefore comprise the fresh fuel, the combustibly enriched exhaust gases, and air to support combustion of these mixed charge ingredients.

The quantity of exhaust gases to be returned to the engine as a charge component will be governed by a number of factors including: the air fresh-fuel ratio of the carbureted mixture supplied by the charge forming device, which determines the completeness of combustion in the engine and hence the proportion of combustibles obtained in the exhaust discharge; the general efficiency of the gas separator employed; and the rapidity with which the desirable treated gases can be withdrawn from the separating device without also drawing back portions of the heavier gases which have been separated out for discharge to the atmosphere. For these reasons I can only say that roughly between 25% and 50% of the volume of the original mixed exhaust gases supplied by the engine can be satisfactorily obtained in an enriched condition from the separator and re-used in the engine as a charge component. The heat of the gases will of course generally determine their density, and some cooling effect, such as may be obtained by making the return pipe 16 between the separator and the engine of substantial length, may have a beneficial effect in increasing the quantity of treated gases which may be successfully employed without impairing the ability of the charge forming device to supply the necessary proportions of fresh fuel and air.

At all events it may be definitely stated that because of the increased combustibility of the exhaust and the elimination of the serious combustion retarding influence of the carbon dioxide, a substantially greater portion of exhaust gases in accordance with my method may be reemployed in the engine than is true in a case where portions of the exhaust are returned to the engine under conventional practice.

As a component of the engine charge, the treated exhaust gases perform a dual function. Not only do they ignite with intense combustion as a power producing agent in the engine cylinders, but they have a marked effect in propagating the flame through the fresh fuel portions of the charge to intensify and quicken the combustion thereof. The explanation for this is rather complicated, and it will here only be stated that it depends upon the law of mass action in mixed gases. The practical effect, however, can readily be appreciated by observing that extremely lean mixtures of air and fresh fuel at or near the limit of inflammability which can not be ignited or which burn so slowly as to have no power producing explosive effect, in the presence of exhaust gases treated under my process ignite instantaneously with violent power producing force in the form of an explosion wave. This means, of course, that tremendous fuel economies may be obtained. The fresh fuel-air ratio may be made far leaner than is normally possible for satisfactory engine operation, say, for example, 1 part of fuel to 16 or 18 parts of air by weight, and adequate power developed by employing the treated exhaust as a supplemental component of the charge.

To supplement what has just been said it should, however, be pointed out that the proportions of air, fresh fuel and treated exhaust gases should be maintained within certain general limits. The combustible exhaust components, hydrogen, carbon monoxide and methane, are far more susceptible to oxidation by the air—which is what takes place during combustion—than is the chemically complicated fresh fuel, by reason of the fact that the combustible exhaust ingredients exist in free readily oxidizable condition as returned to the engine. That is to say, the treated exhaust has a greater affinity for the air than the fresh fuel with the result that, according to the principles of preferential oxidation, the combustible components of the treated exhaust will use whatever air is necessary for their complete combustion and leave only such excess of air as is still available for the oxidation of the fresh fuel.

The phenomena just referred to is desirable and important in order to maintain successful engine operation according to the invention. Since the exhaust gases are valuable for re-use primarily only because of the power available therefrom and their combustion promoting influence on the fresh fuel, it would be impossible to continue to cycle the exhaust gases back to the engine under circumstances where the combustion promoting effect of the gases on the fresh fuel was so complete that the proportion of combustibles obtained in the engine exhaust diminished during continued operation of the engine. It is necessary, therefore, in order to maintain an exhaust containing an appreciable portion of combustibles, that the proportion of air admixed with the fresh fuel and treated exhaust to constitute the engine charge be sufficient to promote the preferential complete combustion of the combustible exhaust components, but limited so that the excess air, over and above that necessary to the combustion of the exhaust, constitute with the fresh fuel a relatively rich mixture such that only incomplete combustion of the fresh fuel is obtained. According to my process, the engine performs the dual function of a power producer and a producer of gases containing unconsumed combustible fuel values resulting from the incomplete oxidation of the fresh fuel in the absence of sufficient air to support complete combustion of the latter.

While for the reasons just indicated, it is desirable to restrict within limits the proportion of air entering the mixed charge, it is still possible to use a relatively lean mixture, as heretofore alluded to, wherein the quantity of fresh fuel can, because of the several beneficial functions of the treated exhaust, be cut materially below that employed in the ordinary engine operation so as to result in substantial fuel economy.

The proper proportions of air and fuel entering the mixed charge may be controlled in the normal manner in the charge forming device 23, the supply of the charge to the engine being controlled by a conventional butterfly valve 25, as shown in the charge forming device 23 of Figure 2, so as to satisfy the demands of the engine under varying speed and load. Since only a portion of the original exhaust, probably not more than 50% as a maximum, is treated and returned to the engine the return pipe 16 from the separator can be somewhat smaller than the main exhaust pipe 13 which carries the gases before treatment. To preserve the proper ratio of the treated exhaust entering the charge with respect to the air and fuel, a control valve 27 similar to the carburetor butterfly valve 25 may be inserted in the pipe 16. By adjustment of the gas return control valve 27, the proper proportions of the gases with respect to the air and fuel may be maintained as the engine demand increases and diminishes.

Several expedients may be resorted to to preserve proper regulation of the exhaust control valve. One such arrangement is shown in Figure 2 wherein the valve 27 is synchronized with the carburetor butterfly valve 25 through a simple linkage which will be self-evident from the drawings. With such an arrangement opening and closing of the carburetor butterfly valve will be accompanied by simultaneous corresponding movement of the exhaust return valve 27.

Another arrangement for controlling the return flow of exhaust gases to the engine is shown in Figures 5 and 6. According to such construction a valve 27' will be interposed at some convenient point in the exhaust return pipe 16. Such element may take the form of a flap valve, and be controlled by the flow of untreated gases into the separator through the pipe 13. For such purpose a similar light flap valve 28 is interposed in the line 13. As the gases discharged from the engine rush through pipe 13 to the separator 14, flap valve 28 will be raised thereby in proportion to the velocity of flow. Through crank arm 29 carried by the valve 28 and a similar arm 30 on the return flow valve 27 and a connecting arm 31 therebetween, valve 27 will be opened and closed to allow a return flow of treated gases to the engine proportionate to the flow of untreated exhaust gases from the engine. A light adjustable spring arrangement 32, as shown in Figure 5, may be provided so as to prevent valve 28, and therethrough valve 27', from opening more than is proper according to the quantity of flow through the pipe 13. Such spring device will also maintain the valves steady in operation so that they will not jump and flap because of vibration or jar. As shown in Figure 6, the respective portions 33 and 34 of the main exhaust pipe 13 and the exhaust return pipe 16 should be of square or rectangular cross-section so that automatically operating flap valves may be employed in the two pipes in lieu of butterfly valves, as it is obvious that the latter type would not be responsive to variations of the flow of gases through the line such as must be the case with the valve 28 employed in line 13.

Under rapid acceleration the speed of the engine and the quantity of fresh fuel and air supplied to the engine will increase rapidly. It may well be that under these momentary conditions the balanced proportions between the treated exhaust, air and fuel may be temporarily lost by reason of a possible lag in the supply of exhaust gases treated and returned behind the operating conditions of the engine. For this reason, particularly since a relatively lean mixture of air and fuel is employed, it is desirable to momentarily increase the quantity of fresh fuel entering the charge. The idea of increasing the quantity of fuel automatically during acceleration is in itself well known in the art, and any of the conventional devices usually forming a part of the carburetor which will pump additional fuel to the engine during acceleration may be employed. Of course, the mixture of fresh fuel, air and exhaust gases is adjusted for operating conditions. On the other hand, no difficulty will be experienced in starting an engine operating with the invention since the lack of combustible exhaust gases can be offset by enriching the charge through the usual carburetor primer or choke.

The main advantages of the invention have already been pointed out together with an accompanying technical discussion which is deemed important and essential to the proper understanding and use of the inventive process and practical systems to carry out the process. The whole purpose of the invention is to treat the exhaust gases so that in the presence of air the combustible portions may be readily ignited so as to render the gases suitable for re-use. Since the exhaust gases as produced by an engine are not in satisfactory condition for any useful recombustion because of the extreme dilution of the combustible components thereof and the presence of combustion retarding ingredients which keep the gases at or below the normal limits of inflammability, a selective separation treatment is employed as a treatment for the gases. The proposed treatment results in an elimination of excessive non-combustible portions of the exhaust accompanied by a beneficial increase in the concentration of the combustible exhaust components so that the gases after treatment, are above the limit of inflammability and susceptible to intense combustion. Due to the fact that the combustible exhaust components are lighter than the combustibly inert and combustion retarding ingredients, a separation may be made on this basis, employing for the purpose a relatively simple separator. A mechanical separator of the centrifugal type has been found to produce highly satisfactory results beyond theoretical expectations. Whether the treated gases are employed in the same or a different engine they will undergo an intense combustion in the presence of air, and in admixture with fresh fuel function not only as a power producing agent but also to propagate and intensify combustion to a point where marked benefits in power production are obtained from the fresh fuel.

Besides producing greater power while at the same time effecting substantial fuel economies, it has been found that an engine operating according to my process and employing my system is smoother in operation, is extremely flexible and may be throttled down to extremely slow speeds, and also manifests a lower engine temperature than ordinary engines. The latter fact may perhaps be explained in part by the elimination of water vapor in the separation treatment of the exhaust gases. By reason of the quick and thorough combustion obtained, the engine cylinders do not tend to carbonize, and the exhaust and intake valves are far less likely to warp or burn out.

The practical embodiment of my invention in the particular engine system herein described and shown in the drawings is to be taken only as illustrative of one way in which my process may be carried out as various engines or combinations of engines having arrangements of parts and details of construction not herein shown may be employed without departing from the scope and spirit of the invention as indicated by the accompanying claims.

I claim:

1. The method which includes centrifuging the flow of exhaust gases discharged from an internal combustion engine and dividing the centrifuged exhaust gases into a plurality of streams, discharging one stream of the exhaust gases to the atmosphere, returning the other stream of the centrifuged gases and using the latter gases in the engine as a component of the engine operating charge.

2. The method which includes centrifuging the flow of exhaust gases discharging from an internal combustion engine under the force developed by the engine, so that the velocity of the gases increases and the centrifugal force acting on the gases intensifies with increases in engine speed and load, returning portions of the centrifuged exhaust to the engine and employing said gases as a part of the engine operating charge.

3. The method which includes centrifuging the flow of exhaust gases discharging from an internal combustion engine and returning for introduction into the engine operating charge portions of the centrifuged exhaust gases, the exhaust gases during centrifuging and return being confined against the admixture therewith of air, and incorporating the returned centrifuged gases as a component of the engine operating charge.

4. The method of producing an explosive charge for internal combustion engines which includes increasing the combustible constituent concentration of internal combustion engine exhaust gases by centrifugally removing from said gases combustibly inert gaseous constituent portions thereof, and forming an engine charge which includes the remaining centrifuged gaseous portion of increased combustible constituent concentration as an essential part thereof.

5. The method of utilizing the exhaust from internal combustion engines including centrifugally separating the exhaust into a lighter gaseous portion containing an increase in the proportion of lighter combustible constituents and into a heavier gaseous portion containing an increase in the non-combustible constituents including the combustion-blanketing carbon dioxide, discharging as waste said separated heavier portion and utilizing the separated lighter portion of the exhaust in an internal combustion engine in the engine charge.

6. The method of utilizing the exhaust from an internal combustion engine consisting in centrifuging the mixed exhaust components and removing a substantial portion of the heavier combustibly inert portions, returning the remaining portion and forming the same into a combustible mixture with fresh fuel and air, and supplying said mixed charge to the engine.

7. The method of producing an explosive charge for use in an internal combustion engine which consists in centrifugally removing from the exhaust discharged by the engine combustibly inert portions thereof and thereby increasing the concentration in the remainder of the exhaust of combustible portions of the exhaust, returning said treated exhaust to the engine and admixing the same with fresh fuel and air.

8. The method of utilizing the exhaust of internal combustion engines which consists in centrifuging and dividing the gaseous exhaust into a usable gaseous portion of increased combustibility containing a greater proportion of the lighter combustible exhaust constituents and containing a correspondingly decreased proportion of the heavier non-combustible other exhaust constituents, and into a remainder portion, and supplying the separated combustibly enriched gaseous portion as fuel to an internal combustion engine.

9. A charge forming system for an internal combustion engine including means for supplying a fresh fuel charge to the engine, means for returning to the engine for admixture with said charge exhaust gases from the engine, and means for centrifuging said exhaust gases prior to admixture with the fuel and air.

10. A charge forming system for an internal combustion engine including means for supplying fresh fuel and air, means for returning to the engine exhaust gases discharged from the engine, means for centrifuging said exhaust gases before return, and means for forming the fresh fuel, air and centrifuged returned exhaust gases into an explosive operating charge and delivering said charge to the engine.

11. An internal combustion engine, means for returning a portion of the engine exhaust gases to the engine for re-use therein, and means for centrifuging the exhaust gases to eliminate combustibly inert portions thereof before return.

12. In combination with an internal combustion engine, an exhaust pipe connecting with the engine exhaust manifold, a gas centrifuging device connecting with the exhaust pipe operating to subject the exhaust gases to centrifugal action, means for separating the centrifuged gases into two streams, means for discharging one of said gas streams to the atmosphere, and means for returning the exhaust gases of the other stream to the engine and reintroducing such gases into the engine as a component of the engine operating charge.

13. In combination with an internal combustion engine, an exhaust discharge pipe connecting with the engine exhaust manifold, centrifuging means depending upon and operating in accordance with the velocity of exhaust gases flowing through the discharge pipe as determined by the engine speed and load to produce a forced redistribution of the exhaust mixture, whereby to create a usable gaseous portion of increased combustibility due to the greater concentration of the lighter combustible gaseous constituents of the mixture and a waste gaseous portion of decreased combustibility due to the greater concentration of the heavier combustible gaseous constituents of the mixture, means for returning the usable gaseous portion of combustibly enriched gases to the engine intake manifold, and discharge means for effecting the escape to the atmosphere of the waste gaseous portion of combustibly impoverished gases.

14. In combination with an internal combustion engine, an exhaust discharge pipe connecting with the engine exhaust manifold, a return pipe for conducting a portion of exhaust gases back to the engine for reintroduction therein as a part of the engine operating charge, means interposed between the discharge pipe and return pipe operating to centrifuge the exhaust gases and eliminate portions thereof, the centrifuging means and return pipe being closed to the admission of air into the exhaust gases, and charge forming means connecting with the engine intake manifold and the return line operating to supply the engine with a mixed operating charge of centrifuged exhaust gases, fresh fuel and air.

15. In combination with an internal combustion engine, centrifuging means receiving the mixed exhaust gases discharging from the engine and operating to eliminate portions of the combustibly inert carbon dioxide and nitrogen components thereof, thereby to increase the concentration and combustibility of the combustible portions of the exhaust, and means for returning the centrifuged gases to the engine intake manifold for use in the engine as a part of the operating charge.

16. An apparatus for utilizing internal combustion engine exhaust gases which includes means causing a flow of said gases to rapidly traverse a spiral path, and means connecting with the interior side of said path for supplying therefrom a portion of the gases to an internal combustion engine.

17. An apparatus for utilizing exhaust gases from an internal combustion engine including means for cycling the exhaust gases back to the engine for reuse therein, a centrifugal separator for increasing the concentration of the lighter combustible constituents of the cycled gases, and a discharge in said separator for the escape of heavier combustibly inert portions of the centrifuged gases.

18. In an apparatus for utilizing the exhaust gases from internal combustion engines, a centrifugal gas separator, a source of exhaust gases providing a rapid flow of said gases through said separator, an outlet in the separator for discharging heavier portions of the centrifuged gas flow, further outlet means in the separator for withdrawing lighter portions of the centrifuged gas flow, an internal combustion engine, and a supply conduit for conducting said lighter portions of the centrifuged gas flow from the separator to said engine.

19. In combination with an internal combustion engine, an exhaust discharge pipe connecting with the engine exhaust manifold, an exhaust gas return pipe communicating with the engine intake manifold, and a centrifugal gas separator connected at its inlet to the exhaust discharge pipe, the inlet end of the exhaust gas return pipe being located interiorly of the separator in its innermost area for withdrawing from the separator the gases to be returned to the engine, and an outlet in the separator for discharging and eliminating from the gases returned portions of heavier components of the exhaust gases.

20. In an apparatus for utilizing the exhaust gases of internal combustion engines, a source of exhaust gases, a hollow casing connecting with said source having a spiral passage for conducting the gases therethrough, an internal combustion engine, a gas supply conduit interconnecting said casing and engine having an intake opening centrally of said spiral passage.

21. In an apparatus for utilizing internal combustion engine exhaust gases, a source of exhaust gases, a conduit connecting with said source, a hollow casing having an intake communicating with said conduit, a central opening extending longitudinally of said casing, a helically formed partition defining a spiral passage extending through the casing and surrounding the central opening, an internal combustion engine, and a gas supply conduit for said engine having an apertured inlet end extending through the central opening in the casing.

22. In an apparatus for utilizing internal combustion engine exhaust gases, a source of exhaust gases, a conduit connecting with said source, a hollow casing having an inlet end communicating with said source, a gas outlet at the other end of said casing, separating means in the casing comprising a spiral passageway adapted to concentrate the lighter portions of exhaust gases as the gases pass towards the gas outlet, means for collecting portions of the lighter exhaust gases, an internal combustion engine, and a supply conduit for conducting the collected lighter portions of the exhaust gases from the casing to said engine intake.

23. In an apparatus for utilizing an internal combustion engine exhaust gases, means for centrifuging the exhaust gases and means for discharging to the atmosphere a portion of the centrifuged gases, means for returning another portion of the centrifuged exhaust gases to the engine intake, a valve regulating the return flow of centrifuged gases and actuating means therefor serving to adjust said valve simultaneously with variations in engine speed and load.

24. In an apparatus for utilizing internal combustion engine exhaust gases, means for separating and removing heavier portions of the exhaust gases, means for returning other portions of the exhaust to the engine intake, a valve regulating the return flow of gases and actuating means therefor serving to adjust said valve simultaneously with variations in engine speed and load.

25. In an apparatus for utilizing internal combustion engine exhaust gases, a charge forming device for supplying a fresh fuel charge to the engine, a control valve regulating the supply of said charge, a gas supply line for cycling exhaust gases back to the engine intake to supplement the fuel charge, separating means in said line for removing heavier portions of the exhaust gases, a valve regulating the return flow of gases to the engine operating in synchronism with the valve controlling the fuel charge.

26. In an apparatus for utilizing internal combustion engine exhaust gases, a charge forming device for supplying a fresh fuel charge to the engine, a control valve regulating the supply of said charge, a gas supply line for cycling exhaust gases back to the engine intake to supplement the fuel charge, separating means in said line for removing heavier portions of the exhaust gases, a valve in the gas line on the return side of the separating means regulating the return flow of gases to the engine, a valve in the gas line on the intake side of the separating means responsive to the rate of flow of the unseparated gases operating and controlling the return regulating valve, whereby the return flow of treated gases will be proportional to the flow of gases supplied to the separator for treatment.

GEORGE L. PRATT.